May 10, 1966 M. R. GUSTAVSON ETAL 3,250,683
HYDRAZINE REACTOR AND PROCESS
Filed March 8, 1960 2 Sheets-Sheet 1

INVENTORS
MARVIN R. GUSTAVSON
ROGER I. MILLER
BY:
Lippincott, Ralls & Hendricson
ATTORNEYS

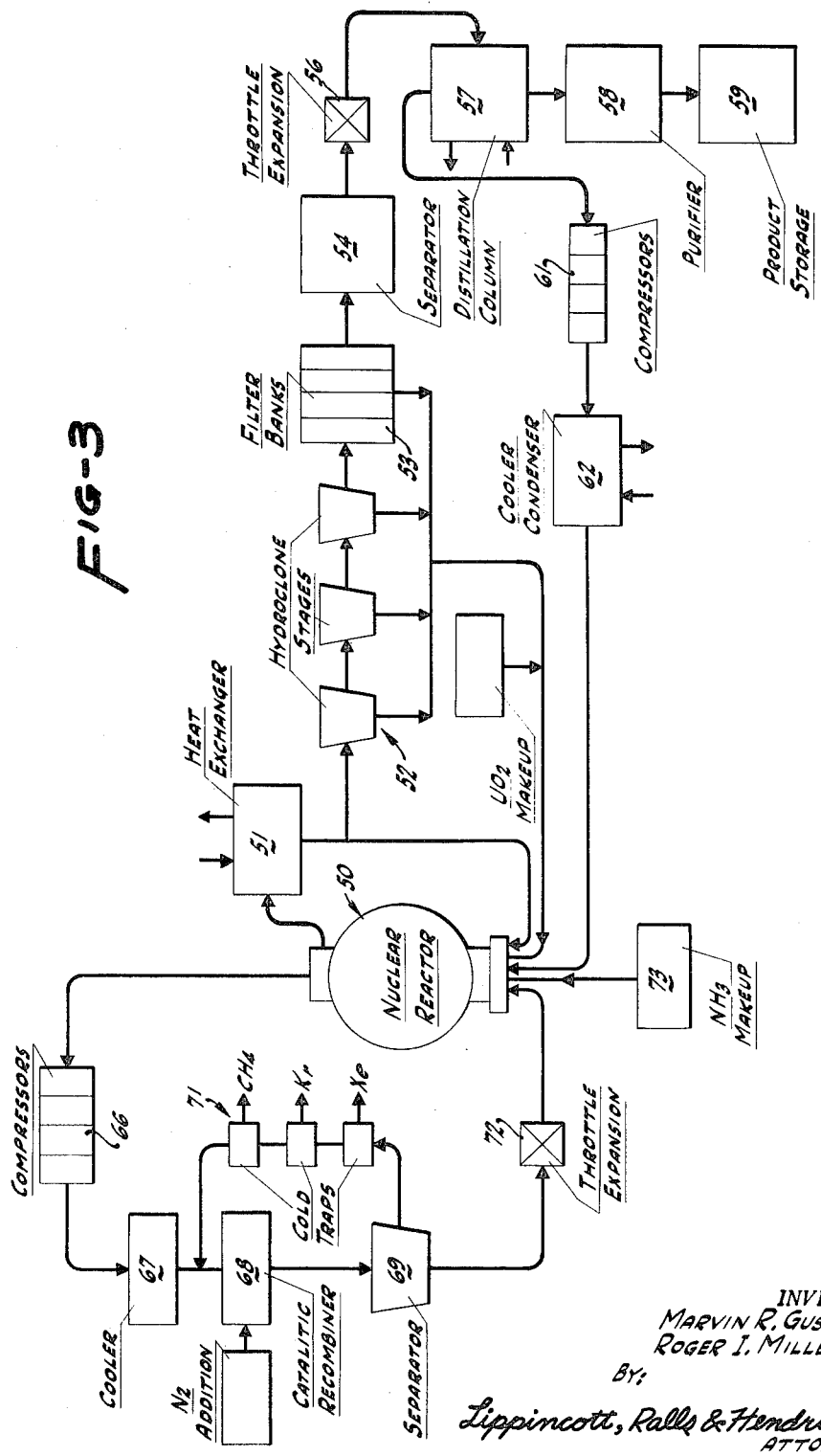

United States Patent Office 3,250,683
Patented May 10, 1966

3,250,683
HYDRAZINE REACTOR AND PROCESS
Marvin R. Gustavson, Walnut Creek, and Roger I. Miller, Danville, Calif., assignors to Aerojet-General Nucleonics, San Ramon, Calif., a corporation of California
Filed Mar. 8, 1960, Ser. No. 13,605
11 Claims. (Cl. 176—39)

The present invention relates to an improved apparatus and process for the production of anhydrous hydrazine and more particularly to the utilization of nuclear fission reactions in the production of hydrazine.

The chemical compound hydrazine is known to be a powerful reducing agent, and to be usable, for example, as a solvent for many inorganic materials, as a reactive intermediate and as a corrosion inhibitor. Additionally, this compound has emerged as an important industrial chemical for use in rocket fuels. Industrial production of hydrazine is conventionally accomplished by the Raschig process which, however, produces a dilute solution of hydrazine and water, and because of the great affinity of hydrazine for water, exceptional separation difficulties are encountered in attempts to isolate the hydrazine to an anhydrous state. Although certain processes are known and practiced in the production of anhydrous hydrazine, the difficulties of separation of the hydrazine from water cause the resultant product to be quite costly. The present invention is particularly directed to an improved process and apparatus for the direct production of anhydrous hydrazine in a highly economic fashion.

The invention hereof contemplates the direct production of anhydrous hydrazine from ammonia by the utilization of the energy of fission fragments from nuclear fission reactions. It is well known that the majority of energy released in the fission of atomic nuclei resides in the fission fragments which result from the reaction. A relatively small percentage of the released energy appears in the form of gamma rays, and the like, and it is relatively conventional to employ same for irradiation purposes. The present invention, on the other hand, directly utilizes the majority of the energy released in the fission of atomic nuclei by directly utilizing the kinetic energy of fission fragments wherein some eighty or more percent of the released energy is concentrated. From basic theory in the field of atomic energy, it is well recognized that the range of fission fragments is quite small, and that consequently these fragments are not available at any substantial distance from the location of their origin. Conventional atomic reactors and atomic reaction processes are wholly unsuited to directly utilize the majority of energy released during atomic fission, for the reason that energy utilization is normally substantially displaced from the point of the actual fission incidents. The present invention provides an intimate admixture of fissionable material and process reactant, which is controllably disposed in a configuration of critical mass of fissionable material suitably moderated so that thermalization of neutrons emitted during fission processes will serve to initiate additional processes, and thereby provide continuous fissioning of the fissionable material so that such fission products as are formed thereby will travel through the reactant. Along the path of these fission fragments, there are established extremely high effective temperatures which are herein utilized to accomplish desired chemical reactions. Furthermore, the relatively low overall temperature of the reactant and contained fissionable material, serves thereby to substantially instantaneously quench the reactions initiated and carried out along the paths or tracks of fission fragments therein. In clear distinction to conventional quenching operations, there is herein provided what may be termed a molecular quenching. Thus, for example, along a fission fragment path within a reactant hereof there will be established an energy density corresponding to a temperature of the order of 10,000 degrees Kelvin, however, the average temperature of the reactant is preferably much less, of the order of 100 degrees C., for example, so that some microns away from the actual fission fragment path there is maintained a low temperature in relation to the temperature along the path.

It is appreciated that the utilization of the energy of fission fragments to accomplish chemical reactions has been discussed in the literature, and certain considerations in connection therewith have been investigated previously. It is also well known that considerable data exist in the open literature relative to atomic fission, both as to the materials suitable therefor, the circumstances surrounding same, and the requisites of critical mass, and the like, for maintaining a continuous reaction of this type. The present invention is, however, particularly directed to the production of anhydrous hydrazine through the utilization of energy available from nuclear fragments resulting from the fission of atomic nuclei. The invention further relates to an improved and simplified nuclear reactor and production plant which may be employed for carrying out the process hereof. A particular and important advantage of the present invention resides in the relatively low cost of processing, wherein the resultant product may be produced at a fraction of the normal cost of anhydrous hydrazine.

It is an object of the present invention to provide an improved and continuous process for the production of anhydrous hydrazine.

It is another object of the present invention to provide an improved process for directly converting ammonia into anhydrous hydrazine by the direct utilization of the energy of motion of the fragments of nuclear fission.

It is a further object of the present invention to provide an improved chemical reaction process for utilizing a very high percentage of energy released from the fission of atomic nuclei, and wherein the reactant is further employed as a neutron moderator to establish conditions favorable for the continuation of the reaction.

It is yet another object of the present invention to provide an improved process and apparatus for the economical production of anhydrous hydrazine.

It is a still further object of the present invention to provide a new and improved nuclear reactor for chemical processing which is particularly adapted to the production of hydrazine.

It is another object of the present invention to provide an improved nuclear reaction process of substantial simplicity for economically producing chemical compounds.

Various other possible objects and advantages of the present invention will become apparent from the following illustrative example of the improved process and apparatus of the present invention; however, no limitation is intended by the terms of the following description, and, instead, reference is made to the appended claims for a precise delineation of the true scope of the present invention.

This invention, in brief, provides for the establishment of a substantially homogeneous fluid including fissionable material and liquid ammonia, and the controllable disposition of such fluid into a critical mass for establishing a continuous fission process, wherein neutrons emitted from the process are thermalized by the moderating properties of the ammonia so as to sustain the fission reaction. Fission fragments with high kinetic energy produced in the fission of material in the fluid will produce a high effective temperature along the paths of such fragments to thereby disrupt ammonia molecules, and the interaction of the molecules and parts thereof during the rapid cooling or quench period results in the production of hydrazine. Certain other materials are also produced at this time, such as hydrogen, and provision is herein made for the full utilization of these by-products of the reaction. The reactor of the present invention is a substantially homogeneous reactor and provides a material simplification over more conventional nuclear reactors. Also, the reactor has an inherent negative temperature coefficient of reactivity so as to be extremely safe for industrial utilization. A suitably homogeneous operating fluid may, for example, be formed by the intimate admixture of finely divided particles of fissionable material in liquid ammonia.

Considering now the chemical reactions which occur in the process and apparatus of the present invention, it is first noted that it is desired to form hydrazine from ammonia. This is herein accomplished by the fissioning of atomic nuclei, passage of the fission fragments through ammonia to establish high effective temperatures along the fragment paths to thereby cause a disruption of ammonia molecules, and the recombination of the parts thereof during the rapid quench period to result in a limited number of possible products. The desired reaction to be carried out herein is as follows: $2NH_3 \rightarrow N_2H_4 + H_2$. It will be appreciated that various possible reactions may occur from the disassociation of ammonia molecules and the foregoing desired reaction may be considered as a combination of the following reactions:

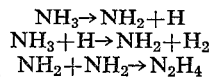

Certain other and undesirable reactions will occur also in varying degrees, and of these the following are worth noting:

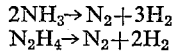

In determining the parameters of the reaction process hereof, it is necessary to account for the formation of relatively undesired products, along with the production of hydrazine, and also to limit operations to such conditions that the decomposition rate of hydrazine from thermal and catalytic breakdowns does not become excessive. In this respect the operating temperature of the process is maintained sufficiently low that thermal decomposition of hydrazine is limited, it being possible to limit same to the order of one-hundredth of one percent per day. Catalytic decomposition is minimized by the elimination from the system of free iron, copper, and chromium ions, as well as the oxides of these metals.

With regard to the provision of energy for disrupting ammonia molecules, there is herein provided for the establishment of a continuous nuclear fission process. It is known that of the some 200,000,000 electron volts of energy released for each fission incident, about 168,000,000 electron volts of energy reside in the fission fragments. The present invention provides for the utilization of this major portion of the energy of nuclear fission, by the intimate admixture of the reactant ammonia with fissionable material. In order to utilize the energy of fission fragments, it is necessary for the fragments to pass through the ammonia reactant. Inasmuch as the mean free path or range of fission fragments is quite short, it follows that few fragments would emerge from large solid particles. The present invention provides a relatively homogeneous fluid without large solid particles. Although a solution of fissionable material is suitable herein the following disclosure is referenced to a fluid containing a uniform dispersion of very finely divided particles of fissionable material. In this manner, the fission reaction of fissionable material in the particle will release fission fragments which then readily emerge from the particle to pass through the ammonia reactant, and consequently, to deposit the majority of fission energy therein. It has been determined that size of fissionable material particles to be employed herein should not exceed 10 microns, and furthermore, that a range of 0.3 to 5 microns is preferable. In connection with the maximum utilization of available energy, and also the attainment of the desired reaction products, it is of extreme importance that very rapid quenching be provided. It has been determined that fission fragments will produce an energy density corresponding to an effective temperature of the order of 10,000 degrees Kelvin along the paths or ionization tracks thereof, and in the present system wherein the fission fragments are carried by the reactant, there is achieved an almost instantaneous quenching of reactions triggered by the energy release, inasmuch as normal molecular collisions in the fluid will transfer local excess energy out of the ionization track and into the surrounding fluid extremely rapidly. There is, in fact, herein attained quenching time of the order of millionths of a second, inasmuch as energy is so rapidly dissipated by molecular action, and this is herein effective to freeze the reaction, or to maintain regrouped atoms formed along the high temperature fission fragment path, inasmuch as insufficient energy is available for decomposition of same.

The present invention is illustrated both as to process and apparatus in the accompanying drawings, wherein:

FIG. 3 is a schematic layout of a processing plant for the production of anhydrous hydrazine.

Figure 1:
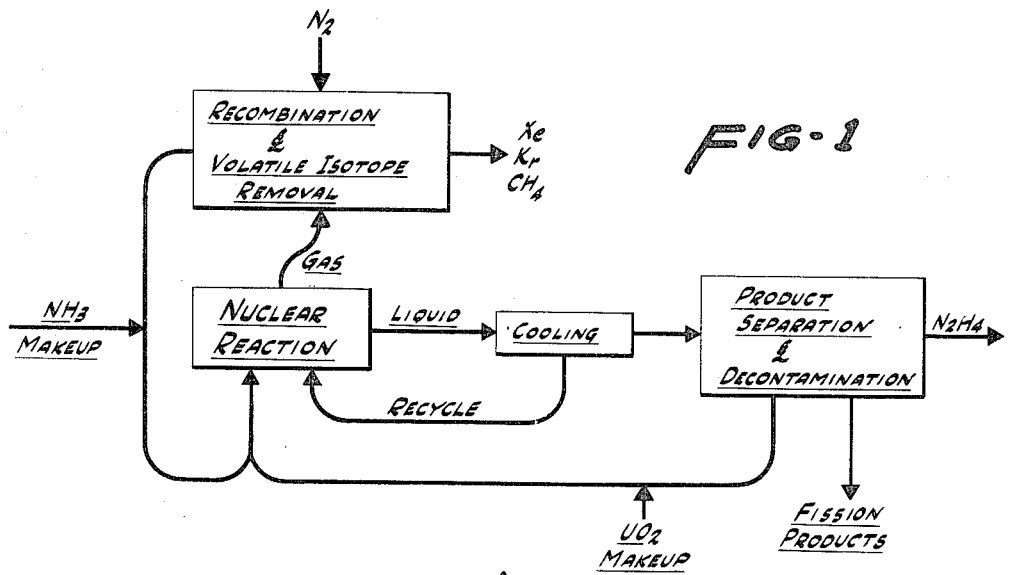
FIG. 1 is a flow diagram of a process for producing anhydrous hydrazine by nuclear reaction.

Considering now the improved reaction process of the present invention, reference is made to FIG. 1. The direct application of atomic energy to the production of chemical reactions is herein accomplished by the mixture of finely divided particles of fissionable material with the reactant. With regard to these particles of fissionable material, it is noted that any desired fissionable material may be employed, including uranium, thorium, and plutonium, and furthermore, that a wide variety of compounds of these materials may be utilized. It is realized that uranium oxide is one of the more commonly available fissionable materials, and in this respect $UO_2$ has been found to be satisfactory for the reaction of the present invention. It is also possible to employ uranium hydrides, carbides, nitrides, nitrates, and sulfides in this respect, and furthermore, pyrophoric materials may be employed, inasmuch as the reaction hereof is controlled to such an extent that same does not constitute a major hazard herein. With regard to the utilization of uranium oxide, the reactions herein employed do not liberate a sufficient quantity of oxygen to raise any hazard. As noted above, the fissionable material is herein provided in particles of minute size, in order that fission fragments may readily travel from the particles to thereby deposit their energy within the surrounding reactant. In this respect, an average particle size of the order of 5 microns is preferred. These minute particles of fissionable material are mixed with pure anhydrous ammonia, and the mixture is then disposed in a reacting volume of a configuration which is critical from a fission standpoint, so that nuclear fission results and continues. It will be appreciated that continuance of nuclear fission of certain nuclear fuels is dependent upon provision of thermal neutrons to initiate fission of atomic nuclei, and herein the ammonia provides the requisite moderating properties to thermalize neutrons.

The chemical process of the present invention thus includes the steps of intimately mixing ammonia with finely divided particles of fissionable material and assembling or disposing this mixture in a critical configuration. The ammonia is compressed so as to thereby liquefy same and a substantially homogeneous fluid results. The nature of ammonia is such that same in a liquid form provides substantial moderating properties, so that high-energy neutrons released through a fission incident are thermalized in passage through the liquid ammonia so as to thereby be available to initiate further fission incidents. In order to accomplish the desired reaction process hereof with any degree of economy and efficiency, it is necessary for the average temperature of the fluid to be maintained within particular limits. Thus, it is known that hydrazine decomposes at substantial temperatures, and the temperature is herein maintained below critical values by employing the liquid ammonia for heat exchange purposes. The foregoing is accomplished by continued recirculation of the liquefied ammonia through the reaction volume, and also through heat exchange apparatus wherein the temperature of the ammonia is reduced.

The establishment of nuclear reactions in the particles of fissionable material carried by the liquid ammonia will be seen to release energy in the form of fission fragments, as well as other particles and rays emitted from the fission of atomic nuclei, and this energy is sufficient to cause decomposition of the ammonia compound. One result of this decomposition is the production of hydrazine, in accordance with the general relationship $2NH_3 \rightarrow N_2H + H_2$. The rapid quenching herein available by molecular interaction serves to freeze the reaction products so that there results a perceptible concentration of hydrazine in the liquid. Unavoidable by-products of the desired reaction hereof include nitrogen and hydrogen, and the reaction is carried out at an appropriate pressure so that these by-products remain in a gaseous state. Consequently, removal of nitrogen and hydrogen is readily accomplished, and in the overall process hereof these by-products are recombined with additional nitrogen to reform ammonia for return to the circulating stream. The liquid reactant, including particles of fissionable material and a small concentration of hydrazine, is appropriately cooled, as indicated in FIG. 1, and may be recycled through the reaction volume. The actual amount of recycling of the liquid including hydrazine, may be varied between individual applications of the present invention. Thus, the yield of hydrazine per pass through the reaction volume is variable, and depends upon numerous factors including the residence time of the reactant and fissionable material in the reaction volume, as well as the actual number of molecules of hydrazine formed per quantum of energy released for each fission incident.

As above noted, the process hereof provides for the emergence from the reaction volume of gases which are suitably operated upon, and liquid which includes the ammonia reactant and fission products, as well as hydrazine formed in the reaction volume. From the liquid there is separated the hydrazine formed by the reaction hereof. Fission products are also removed, and the remaining ammonia and particles of fissionable material are recycled through the reaction volume, with the addition of further fissionable material as required.

In addition to the main cycle of the process hereof, there is also included the above-noted gas cycle, wherein nitrogen and hydrogen formed as a by-product of hydrazine in the nuclear reaction volume are removed, and nitrogen is added in sufficient quantity to combine with the nitrogen and hydrogen removed from the reaction volume to form ammonia, which is then returned to the reaction volume. This returned ammonia is combined with the ammonia, fission particles and added fissionable material from the product separation steps of the process hereof. In the auxiliary gas cycle of the present invention, there are also removed certain gaseous fission products of the reaction. In this respect, there is produced xenon, krypton and carbon 14 as $CH_4$ in the nuclear reaction volume. These particular radioactive isotopes are of substantial value, and are removed from the gas in the recombination and volatile isotope removal step of the present invention. Such radioactive isotopes are then available as a product of manufacture, which may be sold industrially.

From the foregoing, it is believed apparent that the present invention provides a continuous process for the production of hydrazine by the direct utilization of atomic energy, and furthermore, that the hydrazine so produced is anhydrous. The process hereof may be summarized by noting that there is herein combined liquid ammonia and minute particles of fissionable material. This mixture is passed through a reaction volume wherein there is attained a critical mass of fissionable material so that nuclear fission results. Moderation is afforded by the liquid ammonia, and likewise, cooling of the reaction volume is afforded by utilizing the ammonia as a heat exchange medium. The reactant, ammonia, will thus be seen to be utilized for a multiplicity of purposes, including serving as a reactant, as a moderator, and as a heat exchange medium. This multiple utilization of the liquid ammonia results in a material simplification of the reaction process, and also of the associated apparatus which is employed in connection with carrying out the process hereof. As a further step of the present invention, there are separated gaseous products produced in the reaction volume, and these gaseous products are then reconstituted and liquefied for recycling through the reaction volume. In connection with this reconstitution, there are removed gaseous radioactive isotopes which are formed in the reaction. Liquid ammonia, carrying fission particles, and the like, as well as hydrazine formed in the reaction hereof, is removed from the reaction volume in a continuous flow and passed through cooling means for removing excess heat from the ammonia. At least a portion of the reacted material is led off from the flow thereof, and is operated upon to separate hydrazine therefrom, and also to remove fission products therefrom. With the addition of further fissionable material particles, as required, the ammonia is recycled through the reaction volume, so that same is further subjected to reaction conditions whereby additional hydrazine is formed. It will, of course, be appreciated that a variety of different devices and apparatus may be employed in carrying out the process hereof. Thus, it is desirable to materially compress gases which are removed from the reaction volume; however, in this respect a wide variety of compressors and cooling means may be utilized. With regard to particular array of apparatus which may be employed to carry out the process of the present invention, reference is made to the following description of a plant particularly designed for the production of hydrazine in accordance with this invention.

As regards particular reaction parameters, it is highly desirable, in accordance herewith, to utilize certain pressures and temperatures in connection with the carrying out of the reaction wherein hydrazine is formed from ammonia. It is well recognized that hydrazine is a well-known industrial chemical, and that various processes are known for producing this chemical. One of the major advantages of the present invention is the material decrease in cost of hydrazine production, and in this respect it thus follows that the cooling operations which are necessary in the process hereof, may be most economically accomplished by the utilization of water at normal temperatures. This particular condition imposes certain limitations upon the process hereof, for if it be assumed that cooling water is to be provided for removing heat from the ammonia at the coolant water inlet temperature of about 80 degrees F., it thus follows that an economical inlet ammonia temperature is about 90 degrees F. A further limitation with regard to available reaction temperatures is the decomposition temperature of hydrazine, for if the reaction hereof is carried out at too high an average temperature, it will be appreciated that the efficiency of the operation will be reduced by the substantial decomposition of hydrazine. Further with regard to operating parameters, it is herein desired, and, in fact, requisite that ammonia be employed in a liquid form, so that a pressurization of the reactant is necessary. More specifically to the operating parameters hereof, it is contemplated that the reaction may be most advantageously carried out at an ammonia pressure of about 500 pounds per square inch absolute, and furthermore, that the average reaction temperature shall be maintained in the range of about 120 degrees F. It has been determined that substantial increases in pressure do not operate to materially increase the yield of hydrazine through the reaction of this invention. It is, however, apparent that material increases in pressure serve to impose more exacting requirements upon associated apparatus, and consequently, to undesirably increase the capital expenditure necessary for apparatus employed in carrying out the process hereof.

Further to the optimization of operating parameters for attaining the objects of the present invention, it has been determined that control of the reaction may be readily accomplished by the conventional provision of removable neutron absorbing means provided, for example, in the form of control rods. Further operating parameters of the present invention, whereby the objects of low cost production of anhydrous hydrazine are attained, are set forth below in connection with the description of an operating plant, in accordance with the present invention.

Figure 2:
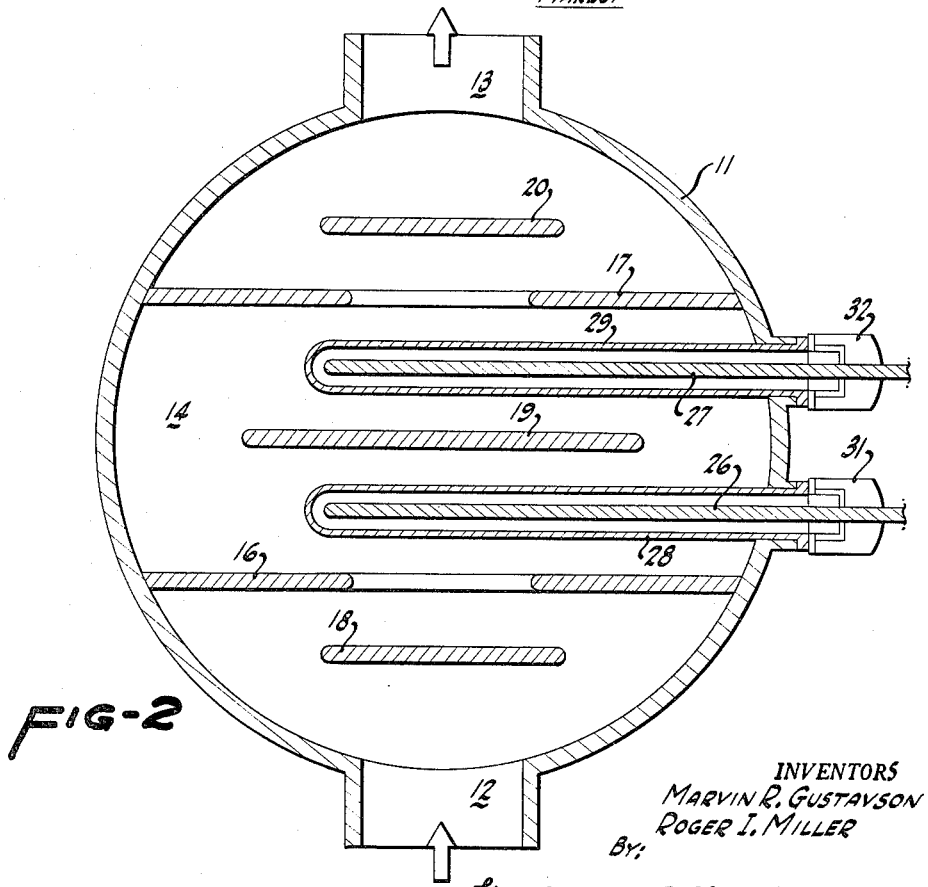
FIG. 2 is a sectional view of the nuclear reactor vessel of the present invention.

With regard to the actual structure of the nuclear reactor vessel of the present invention, reference is made to FIG. 2 wherein there will be seen to be illustrated a sphere 11, which serves to define the reaction volume of this invention. This vessel 11 is preferably formed of a material such as stainless steel, and as regards the vessel itself and any and all members disposed therein or in connection therewith, which may at any time be contacted by the materials undergoing reaction, it is particularly important to exclude materials that would catalyze hydrazine decomposition. In this respect there is preferably excluded sources of ions of the metals iron, copper, and chromium, as well as any oxides of these metals. This particular precaution is necessary in order to guard against possible catalytic decomposition of hydrazine. With regard to the physical configuration of the vessel 11, it is appreciated that various alternatives are possible; however, inasmuch as the vessel is intended as a pressure vessel through which the reactant is designed to flow, certain advantages lie in the utilization of a spherical shape. Upon opposite sides of the vessel there are provided inlet and outlet connections, and as herein shown, an inlet portion 12 is provided at the bottom of the vessel and an outlet port 13 at the top thereof. As above noted, the liquid ammonia and admixed particles of fissionable material are passed through the reaction volume 14, defined by the vessel, and it is desired to attain a substantially uniform liquid velocity of flow through all parts of the vessel. To this end, there are preferably provided baffles within the reaction volume, in order to relatively evenly disperse the flow of liquid through the vessel. As shown, there are employed a pair of doughnut baffles 16 and 17, which are spaced apart between the inlet and outlet ports, with each of these baffles having central apertures therethrough for the passage of fluid. Additional disc-type baffles 18, 19 and 20 are disposed transversely of flow on a line between the inlet and outlet ports, and preferably coaxially therewith, so as to be alined with the openings in the doughnut baffles. With this or equivalent baffling interiorly of the vessel 11, it will be seen that a liquid forced into the inlet port 12 at the bottom of the vessel will flow about the first disc-baffle 18, and thence together through the opening in the next adjacent baffle 16, and so on through the vessel to the outlet port 13 at the top thereof.

In connection with the operation of the nuclear reactor hereof, it is particularly noted that same is adapted to be charged by liquid ammonia carrying finely divided particles of fissionable material, such as, for example, uranium oxide, or any of a variety of compounds of uranium, plutonium, or thorium. This liquid is forced into the under side of the vessel through the entry port 12, and is maintained under pressure as of the order of 500 pounds per square inch within the vessel, and flows through the vessel about the baffles therein, and thence out the outlet port 13. In distinction to more conventional reactor structures, the foregoing provides a completely operable nuclear reactor. Thermalization of neutrons within the reactor is herein attained by the moderating properties of the liquid ammonia employed to carry the fissionable material through the vessel. It is not necessary herein to provide a separate moderator, either as a solid or liquid. The liquid ammonia further serves the function of maintaining a desired temperature within the vessel. Inasmuch as the liquid ammonia is circulated through the vessel, it is quite simple to control the residence time of the ammonia within the vessel, and consequently, to control the amount of heat absorbed by the ammonia. Through the provision of suitable cooling means exteriorly of the vessel, it is possible to remove heat from the ammonia which has passed through the vessel, and thence to recirculate the ammonia through the vessel. Whether or not the ammonia is recirculated, it yet follows that heat generated within the vessel 11 by nuclear fission is deposited in the moving stream of liquid ammonia, and is thence removed from the vessel so that by the control of the flow of ammonia it is possible to control the temperature within the vessel. This particular feature will be noted to fully replace normal cooling means associated with nuclear reactors. It is well recognized that very large amounts of heat are liberated in the process of nuclear reactions, and consequently, that it is of extreme importance to remove such heat in order to prevent serious damage to reactor structures. It is conventional in this respect to utilize a separate cooling system; however, the reactor of the present invention removes all necessity for this entire separate system, and consequently, materially simplifies the reactor structure. Control over the actual nuclear reaction within the vessel hereof, may be provided by control rods conventionally mounted in the vessel, and adapted for movement into and out of the vessel to dispose a controllable amount of neutron absorber therein. In this respect, there is illustrated a pair of control rods 26 and 27, mounted for lateral movement in the chamber 14 of the vessel and protected, for example, by thimbles 28 and 29, which sealingly engage the side of the vessel. The control rods 26 and 27 extend through the vessel wall and are engaged exteriorly of the vessel by control rod drive means 31 and 32 which may be of conventional design, and which serve to provide for the controllable disposition of the desired amount of neutron absorbing material within the vessel. The control rods 26 and 27 may be formed in conventional manner of neutron absorbing material, and thus no further discussion of the control rod structure, or drive means, is herein included.

Although it may be desirable to provide shielding about the reactor vessel, in accordance with conventional practices, in order to safeguard personnel operating in the area, this is the only addition to the actual nuclear reactor necessary. The illustration in FIG. 2 is that of a complete operable reactor, and a comparison of this with conventional reactor structure demonstrates the material improvement in simplicity attained by the present invention. Not only does the present invention provide the substantial simplification in the physical structure of a nuclear reactor, but furthermore, the reactor hereof provides material advantages over conventional reactors. By the utilization of a fluid, herein liquid ammonia, circulating through the reactor vessel and carrying the fissionable material in the stream of flow therethrough, it will be appreciated that all problems of fuel poisoning are herein obviated. The continuous recycling of the fuel through the vessel provides the opportunity of operating upon such fuel exteriorly of the vessel, as desired or required. Consequently, the prior-art problems of reactor shutdown and cleanout, in order to replace fuel rods, and the like, are herein wholly precluded. Any and all desired operations upon the nuclear fuel of the reactor may be readily accomplished exteriorly of the reactor vessel, without in any way interfering with the continuous operation of the reactor. Additionally, by the utilization of ammonia as the fluid passed through the reactor vessel, it will be seen that prior-art problems of moderating the reactor are herein overcome by the fluid itself, without the necessity of providing extensive mechanical structure. Furthermore, the liquid ammonia circulated through the vessel serves to remove excess heat therefrom, so that integral cooling systems, which are conventional with nuclear reactors, are not necessary, and heat transfer from the primary fluid may be accomplished exteriorly of the vessel. This provides substantial advantages in that maintenance problems are thereby substantially reduced.

The improved nuclear reactor of the present invention described above, may be employed in the production of anhydrous hydrazine by the utilization of suitable associated equipment providing for the separation of hydrazine from the ammonia, and for operating upon both the liquid and gaseous outputs from the reactor for return of desired portions thereof to recycle through the reactor vessel. In this respect, attention is invited to FIG. 3, wherein there is illustrated an improved chemical plant for the production of anhydrous hydrazine, and including a liquid ammonia reactor, such as that illustrated in FIG. 2. Throughout the plant precautions are, of course, taken to prevent any sizeable concentration of fissionable material that could become critical. In the following description of the processing plant hereof, there are included exemplary flow rates, quantities, and sizes for the purpose of illustrating an operable processing plant. It will, of course, be appreciated that the size of the plant may be varied, with a consequent variation in the figures as set out below, and that these figures are intended only as an example of operation, rather than as a limitation upon the invention. With a 174 M.W. nuclear reactor 50, having an 8 ft. diameter and operating with ammonia under a 500 p.s.i.a., and an average temperature of 118 degrees F., there may be circulated by suitable pumping means some 29,200 g.p.m. of fluid through the reactor. The residence time of fluid in the reactor is about four seconds. An inlet temperature of 90 degrees is maintained by a heat exchanger 51, and with the above-noted flow of fluid through the reactor, an outlet temperature of 145 degrees F. is experienced. The heat exchanger 51 may operate with water as a coolant, and an inlet water temperature of 80 degrees F. and an outlet temperature of 110 degrees F. requires a coolant water flow of 39,700 gallons per minute, with $1.5 \times 10^5$ square feet of heat exchange surface to thereby remove about $5.0 \times 10^8$ B.tu. per hour. The physical configuration of the heat exchanger unit may, for example, comprise a stacked matrix of relatively small heat exchangers in parallel configuration, and from the output of this heat exchanger there is bled off about 1300 gallons per minute of fluid at 90 degrees F., and 500 p.s.i.a. This fluid contains liquid ammonia, hydrazine, fission products, and particles of fissionable material. The bleed-off fluid is fed into means for removing the particles of fissionable material, and such means may include hydroclone or hydraulic cyclone separators. The hydroclone separation is preferably divided into three stages, with each stage including about six units capable of processing about 200 gallons per minute.

The hydroclone stages 52 serve to separate out a slurry including the particles of fissionable material, and the remaining fluid is passed through a filter bank 53 from which the remaining particles of fissionable material are retrieved. The output from the filter banks is passed through a separator 54 which may, for example, comprise an ion exchanger for removing fission products from the stream. The output from the separator 54 is yet at 500 p.s.i.a., and is then preferably passed through a throttle expansion 56, to reduce the pressure to about 100 p.s.i.a., and this low-pressure fluid is then applied to a distillation column 57.

Expansion of the fluid and heating thereof in the distillation column to about 90 degrees F., results in an ammonia vapor pressure of about 180 p.s.i.a., and a hydrazine vapor pressure of less than 0.4 p.s.i.a. Suitable heating of the distillation column may be accomplished from the outlet coolant water from the primary heat exchanger 51, and it will be appreciated that with the very substantial difference in vapor pressure between ammonia and hydrazine, a substantially complete separation of ammonia and hydrazine may be accomplished by distillation. From the distillation column, there is removed liquid hydrazine at the rate of about 10 gallons per minute, and this flow of hydrazine is preferably passed through purification means 58 to remove vestigial traces of radioactivity. The purified hydrazine may then be directed into a product storage unit 59, and the flow of hydrazine therein as a liquid will occur at the rate of about 3860 pounds per hour.

The ammonia removed from the flow by the distillation column 57, leaves such column at the rate of about 20,000 cubic feet per minute, as a gas, at 100 pounds per square inch absolute, and is then passed through suitable compressors 61 having interstage cooling to liquefy the ammonia and raise the pressure thereof to about 500 p.s.i.a. The desired ammonia inlet temperature for the reactor may be attained by the provision of a suitable cooler condenser 62 to lower the liquid ammonia temperature to about 90 degrees F., and a flow of about 1200 g.p.m. of liquid ammonia is attained therefrom. This liquid ammonia is returned to the inlet of the nuclear reactor to form a part of the fluid recycle therethrough. To this returned ammonia there is added fissionable material as reclaimed from the hydroclone stages and filter bank, with such reclamation and redispersion as may be required. A flow of about 100 gallons per minute of slurry containing fissionable material particles is received from the hydroclone stages and filter banks, and there is added to this further fissionable material as a make-up at the rate of 230 grams per day.

In addition to the liquid system of the process discussed above, there is also provided a gaseous system, inasmuch as there is produced in the nuclear reactor 50 a substantial quantity of nitrogen and hydrogen in gaseous form. From the top of the nuclear reactor, there is removed a gas flow including nitrogen at the rate of about 3400 pounds per hour, and hydrogen at the rate of about 970 pounds per hour, together with certain gaseous fission products. The total gas flow rate from the reactor is about 110 cubic feet per minute, at a pressure of about 500 p.s.i.a. Operation upon this gas includes the compression of same in a multi-stage compressor 66, preferably having interstage cooling, to thereby produce a pressure increase to about 12,000 p.s.i.a. An additional cooler 67 in the line serves to reduce the temperature of this flow to about 100 degrees F., and such flow is then directed into a catalytic recombiner 69, to which there is added nitrogen, at the rate of about 1120 pounds per hour, under a pressure of 12,000 p.s.i.a. The catalytic recombiner may be of conventional construction, utilizing a metal catalyst to convert nitrogen and hydrogen into ammonia. The addition of make-up nitrogen is necessary to adjust the molar ratio for complete conversion of the nitrogen-hydrogen mixture to ammonia. It will be appreciated that there is included in the above-described flow, a certain amount of gaseous fission products, which will include xenon, krypton, and carbon 14 in the form of $CH_4$. A separator 69 is provided following the catalytic recombiner 68, for recycling hydrogen and nitrogen through the catalytic recombiner, and removing liquid ammonia from the flow. In this gas recycle line, there may be provided cold traps 71 serving to liquefy the gaseous fission products at separate stages thereof, Xe liquefying at 62° F., Kr at −81° F., and $CH_4$ at −116° F. The liquid ammonia at 12,000 pounds per square inch absolute flowing from the separator 69, is passed through a throttle expansion 72 to reduce the pressure thereof to 500 p.s.i.a., and is thence directed into the input of the nuclear reactor. Inasmuch as a certain amount of the liquid ammonia passing through the reactor is acted upon to form other products, it will be appreciated that makeup ammonia is required, and same is indicated at 73. This make-up ammonia is provided at the rate of about 2750 pounds per hour.

With regard to the composition of fluid passed through the nuclear reactor, it is preferable that this fluid be composed of pure anhydrous ammonia carrying finely divided particles of fissionable material. This fissionable material may be provided as enriched uranium dioxide in particles of 5 micron diameter at a concentration in the range of 10 to 100 grams of uranium dioxide per liter of fluid. More specifically to this example the concentration is about 37.2 grams per liter. In the above-described system, the reactor fluid will build up a concentration of hydrazine equal to about one weight percent, wherein a very low yield rate is employed in the operation. In this respect, it is noted that the nitrogen-hydrogen bond requires 84,200 calories per mole to rupture, and from this it may be calculated that 27.3 molecules of hydrazine may be theoretically produced for each 100 electron volts of energy released in the fission reaction. It will, of course, be appreciated that numerous factors serve to reduce this theoretical value, and the plant above described is based upon a conservative yield of one molecule per 100 electron volts of deposited energy.

Further to the foregoing, it is noted that there may be herein defined a "quantum yield" or "G" value, which is equal to the number of molecules of hydrazine formed per 100 electrons volts of energy released in the fission reaction. It will be appreciated that the actual G value attained in the process plant depends upon a multitude of factors, and that various steps may be taken to maximize same. The plant figures, hereinabove set forth, are based upon a yield factor of $G=1$, which will be appreciated to be very conservative. This relatively low factor clearly compensates for any and all factors in the process which tend to decrease the yield, and particularly, the undesired chemical reactions occurring within the nuclear reactor. Even with this low yield factor employed as the basis for the above figures, there results a highly economical production process.

The above-described plant produces about 3860 pounds of hydrazine per hour, and, based upon a 300-day-per-year, 24-hour-per-day production schedule with a product recovery factor of 90 percent, there results a nominal production of 25,000,000 pounds of hydrazine per year. At a market price of about sixty cents per pound, it may be calculated that the entire capital and operating cost of the processing plant may be recovered in less than one and one-half years. It will be appreciated that this market price of hydrazine is substantially less than that presently available. At a substantially reduced selling cost for hydrazine of about twenty-five cents per pound, the entire cost of plant construction, operation, and maintenance may be recovered in less than six years. The foregoing economic evaluation is based wholly upon the assumption that the sole recovery is in the form of marketable anhydrous hydrazine; however, the economic picture may be even further improved by considering the fact that a substantial quantity of saleable fission products are also produced. Saleable carbon 14 is produced in the form of methane at the rate of about 10 grams per day. Also, for example, isotopes of krypton and xenon, as indicated, are produced in the quantities set forth below:

*Curies accumulated per day*

| Fission product | After 1 Hour Decay | After 10 Hours Decay |
|---|---|---|
| $Kr^{83}$ | $5.4 \times 10^6$ | $1.7 \times 10^5$ |
| $Kr^{85}$ | $4.8 \times 10^6$ | $1.2 \times 10^6$ |
| $Kr^{87}$ | $3.0 \times 10^7$ | $2.5 \times 10^5$ |
| $Kr^{88}$ | $2.0 \times 10^7$ | $2.0 \times 10^6$ |
| $Xe^{133}$ | $1.3 \times 10^6$ | $1.2 \times 10^6$ |
| $Xe^{135}$ | $1.6 \times 10^7$ | $7.9 \times 10^6$ |
| $Xe^{138}$ | $3.4 \times 10^7$ | |

Furthermore, there is produced a large quantity of heat, which may also be usefully employed to further improve the economics of the plant hereof. Thus, in the above example of a processing plant, in accordance with the present invention, there is removed from the recycled flow of liquid ammonia, about $5.9 \times 10^8$ B.t.u. per hour of heat, and this heat may be put to use for sale in the production of power.

There has been set forth above, a description of an improved process and plant for the economic production of anhydrous hydrazine. As above noted, this chemical has a wide applicability in industry, and its preparation by conventional methods is quite costly. The present invention provides for the direct utilization of atomic energy in the form of fission fragments to supply the requisite energy for decomposition of liquid ammonia, and further provides for the rapid quenching of reactions associated therewith, so that there results a commercially usable quantity of hydrazine in the ammonia. There is further provided herein for the separation of this hydrazine from the ammonia, and also for the recyling and reconstitution of the ammonia and admixed particles of fissionable material, so that a continuous process is attained. By the utilization of finely divided particles of fissionable material having a diameter in the range of 0.3 micron to 10 microns, it is possible to fully utilize substantially all of the energy liberated in the fission of atomic nuclei. A highly improved nuclear reactor is also herein provided, wherein liquid ammonia is employed as a chemical reactant, from which the end product is formed, and this liquid ammonia is furthermore utilized as a moderator for the fission process and as heat exchanger to maintain a desired temperature in the reaction volume. In this manner, a material simplification over conventional nuclear reactors is attained, and the basic object of economic production of anhydrous hydrazine is furthered.

What is claimed is:

1. An improved process for producing hydrazine comprising the steps of forming a reactor fuel of a substantially homogeneous fluid including liquid ammonia and fissionable material, passing said fuel through a critical volume whereby nuclear fission results and continues from thermal neutrons moderated by the liquid ammonia, said nuclear fission releasing sufficient energy in fission fragments to decompose ammonia and produce hydrazine, and separating hydrazine from said ammonia and decontaminating the hydrazine as a chemical product of the process.

2. A process of producing anhydrous hydrazine comprising uniformly dispersing in ammonia particles of fissionable material having an average diameter less than ten microns, pressurizing the ammonia to liquefy same, continuously circulating said ammonia through a critical volume for nuclear fission whereby said material undergoes fission which is continued by thermalization of neutrons in the liquid ammonia, removing heat from the ammonia to maintain an average temperature in said critical volume below the temperature of substantial thermal decomposition of hydrazine whereby ammonia emerging from said critical volume contains liquid hydrazine produced by the endothermic decomposition of ammonia, and separating said hydrazine from said ammonia.

3. A process as set forth in claim 2, further defined by the steps of recombining with additional nitrogen gaseous nitrogen and hydrogen produced in said critical volume to form ammonia and returning the latter for recirculation through said critical volume.

4. A process as set forth in claim 2, further defined by said separating step being carried out by lowering the pressure of liquid ammonia with liquid hydrazine therein while adding heat thereto for distilling ammonia from the hydrazine.

5. An improved continuous reaction process for producing anhydrous hydrazine comprising the steps of passing a liquid reactor fuel through a critical volume for fission reactions while moderating same to establish controlled nuclear reactions therein liberating energy chiefly in fission fragments, containing said fuel of pressurized anhydrous ammonia having finely divided particles of fissionable material uniformly dispersed therein whereby fission energy decomposes ammonia to produce hydrazine and the liquid ammonia serves as a neutron moderator, limiting the average fluid temperature in said critical volume by controlling the flow rate and heat content of ammonia flowing therethrough, controlling the power level in said critical volume by disposing a controllable amount of neutron absorbing material therein, and separating hydrazine from ammonia exteriorly of said critical volume.

6. An improved process as set forth in claim 5, further characterized by recirculating said fuel through said critical volume while adding liquid ammonia and particles of fissionable material thereto for makeup of losses thereof, at least a portion of said added ammonia being composed of nitrogen and hydrogen from said critical volume recombined with additional nitrogen.

7. A process as set forth in claim 5, further defined by said liquid fuel being maintained at a pressure of the order of 500 pounds per square inch and the average temperature of fuel in said critical volume being maintained in the order of 118° F. by cooling and recirculating the liquid ammonia.

8. An improved process as set forth in claim 5, further defined by said fuel comprising liquid ammonia at a pressure of the order of 500 pounds per equare inch with a concentration in the range of ten to 100 grams per liter of fissionable material in the form of particles having an average diameter of the order of five microns, and the critical volume containing approximately 270 kilograms of fissionable material with a fuel residence time therein of approximately four seconds.

9. An improved plant for producing anhydrous hydrazine comprising a substantially homogeneous nuclear reactor fueled by liquid ammonia carrying finely divided particles of fissionable material flowing therethrough; a fuel recirculation loop including a heat exchanger removing heat from the fuel leaving the reactor; a processing system connected to said recirculating loop for receiving a portion of recirculated fuel and including means separating fissionable material from the fuel, distillation means separating ammonia from hydrazine, compression means pressurizing the distilled ammonia to reliquefy same, and means combining the separated fissionable material together with make-up fissionable material with the reliquefied ammonia and returning same to the nuclear reactor; and means removing gases formed in the reactor.

10. A hydrazine plant as set forth in claim 9, further defined by compression means connected to said gas removal means, a catalytic recombiner connected to said compressor and reforming ammonia from hydrogen and nitrogen gas removed from said reactor, means separating gaseous fission fragments from the reformed ammonia, and means expanding the reformed ammonia to the original pressure thereof and directing same back into the reactor.

11. An improved process for producing hydrazine comprising the steps of forming a reactor fuel of a substantially homogeneous fluid including liquid ammonia and fissionable material, passing said fuel through a critical volume whereby nuclear fission results and continues from thermal neutrons moderated by the liquid ammonia, said nuclear fission releasing sufficient energy in fission fragments to decompose ammonia and produce hydrazine.

References Cited by the Examiner

UNITED STATES PATENTS 2,898,277  8/1959  Harteck et al. _____ 204—154

OTHER REFERENCES

Proceedings of the Second International Conference on the Peaceful Uses of Atomic Energy, Geneva, Sept. 1–13, 1958; vol. 29, pp. 367–369, article by Dolle; vol. 8, pp. 253–262, article by Dawson et al.

Proceedings of the International Conference on the Peaceful Uses of Atomic Energy, Geneva, Aug. 8–20, 1955; vol. 3 pp. 263–282, article by Beall et al.

"The Chemistry of Hydrazine," Audreith & Ogg, John Wiley & Sons Inc., New York, 1951, pp. 52 and 66.

Nuclear Science Abstracts, vol. 10, Abstracts #8788, 1956.

"Introduction to Nuclear Engineering," by R. L. Murray, Prentice-Hall, 1954, pp. 167–169.

REUBEN EPSTEIN, *Primary Examiner.*

ROGER L. CAMPBELL, CARL D. QUARFORTH, LEON D. ROSDOL, *Examiners.*

S. F. STONE, J. F. DAVIS, M. R. DINNIN, *Assistant Examiners.*